(12) United States Patent
Xie et al.

(10) Patent No.: US 10,029,347 B2
(45) Date of Patent: Jul. 24, 2018

(54) PNEUMATIC MACHINING DEVICE

(71) Applicants: SHENZHENSHI YUZHAN PRECISION TECHNOLOGY CO., LTD., Shenzhen (CN); CLOUD NETWORK TECHNOLOGY SINGAPORE PTE. LTD., Singapore (SG)

(72) Inventors: Ren-Gui Xie, Shenzhen (CN); Ai-Jun Tang, Shenzhen (CN); Feng Zhang, Shenzhen (CN)

(73) Assignees: SHENZHENSHI YUZHAN PRECISION TECHNOLOGY, Shenzhen (CN); Cloud Network Technology Singapore Pte. Ltd., Singapore (SG)

( * ) Notice: Subject to any disclaimer, the term of this patent is extended or adjusted under 35 U.S.C. 154(b) by 291 days.

(21) Appl. No.: 14/832,411

(22) Filed: Aug. 21, 2015

(65) Prior Publication Data

US 2016/0061226 A1    Mar. 3, 2016

(30) Foreign Application Priority Data

Sep. 2, 2014  (CN) .......................... 2014 1 0441940

(51) Int. Cl.
*F15B 11/06* (2006.01)
*F15B 13/04* (2006.01)
(Continued)

(52) U.S. Cl.
CPC .............. *B24B 47/14* (2013.01); *B23K 20/12* (2013.01); *B23K 20/1285* (2013.01)

(58) Field of Classification Search
CPC ......... B24B 47/10; B24B 47/14; B24B 47/16; B24B 47/18; B24B 37/04; B24B 49/08; B24B 27/0076; B23K 20/1285
(Continued)

(56) References Cited

U.S. PATENT DOCUMENTS

| 4,735,353 A | * | 4/1988 | Thomson | B23K 20/1285 228/113 |
| 5,065,665 A | * | 11/1991 | Kimura | F15B 11/06 137/596.16 |
| 5,274,286 A | * | 12/1993 | Yamamura | B23Q 1/70 310/262 |

(Continued)

FOREIGN PATENT DOCUMENTS

| CN | 203245689 U | | 10/2013 | |
| JP | H05162052 A | | 6/1993 | |
| KR | 20100130956 A | * | 12/2010 | ............. B24B 49/08 |

*Primary Examiner* — Michael Leslie
*Assistant Examiner* — Richard Drake
(74) *Attorney, Agent, or Firm* — ScienBiziP, P.C.

(57) ABSTRACT

Pneumatic machining device includes a fixing plate, a hollow piston shell, a piston group, a machining tool, a first sealing group, and a second sealing group. The piston shell is fixed to the fixing plate and coupled to a first external pressure source and second external pressure source to feed gas into the piston shell to drive the piston group and the machining tool, respectively. The piston group and the first and second sealing groups are received inside the piston shell. The piston group is driven by the first external pressure source to move away from the fixing plate. The first and second sealing groups divide the piston shell into a number of chambers for controlling a gas pressure. The machining tool is coupled to the piston group and extends out of the piston shell to machine a workpiece as the piston group moves away from the fixing plate.

18 Claims, 5 Drawing Sheets

(51) Int. Cl.
*B23K 20/12* (2006.01)
*B24B 47/14* (2006.01)

(58) Field of Classification Search
USPC .............. 228/2.3, 112.1; 451/288, 5, 57, 65; 91/8, 508
See application file for complete search history.

(56) References Cited

U.S. PATENT DOCUMENTS

| | | | |
|---|---|---|---|
| 5,558,265 A * | 9/1996 | Fix, Jr. ............... | B23K 20/1285 228/2.1 |
| 6,386,956 B1 * | 5/2002 | Sato ................... | B24B 27/0076 451/57 |
| 6,779,709 B2 * | 8/2004 | Stotler ............... | B23K 20/1285 228/113 |
| 7,458,878 B2 * | 12/2008 | Walsh ................ | B24B 7/22 451/41 |
| 7,770,777 B2 * | 8/2010 | Miller ................ | B23K 20/1285 156/73.5 |
| 7,950,563 B2 * | 5/2011 | Hull .................. | B23Q 5/06 228/112.1 |
| 7,967,552 B2 * | 6/2011 | Brett .................. | B05B 3/1035 415/80 |
| 8,574,034 B2 * | 11/2013 | Sgarabottolo ........ | C03B 33/04 451/461 |
| 2006/0269369 A1 * | 11/2006 | Fritsche .............. | B23B 47/34 408/17 |
| 2007/0037485 A1 * | 2/2007 | Neely ................. | G02B 7/023 451/5 |
| 2013/0344778 A1 * | 12/2013 | Schafer .............. | B24B 13/023 451/294 |

* cited by examiner

PNEUMATIC MACHINING DEVICE

FIELD

The subject matter herein generally relates to machining devices, and more particularly to a pneumatic machining device.

BACKGROUND

Pneumatic machining devices may be attached to a robotic arm and controlled by gas to machine a workpiece. It is desirable to provide a pneumatic machining device that can maintain a constant position and a constant pressure while machining the workpiece to prevent uneven machining of the workpiece.

BRIEF DESCRIPTION OF THE DRAWINGS

Implementations of the present technology will now be described, by way of example only, with reference to the attached figures.

DETAILED DESCRIPTION

Figure 1:
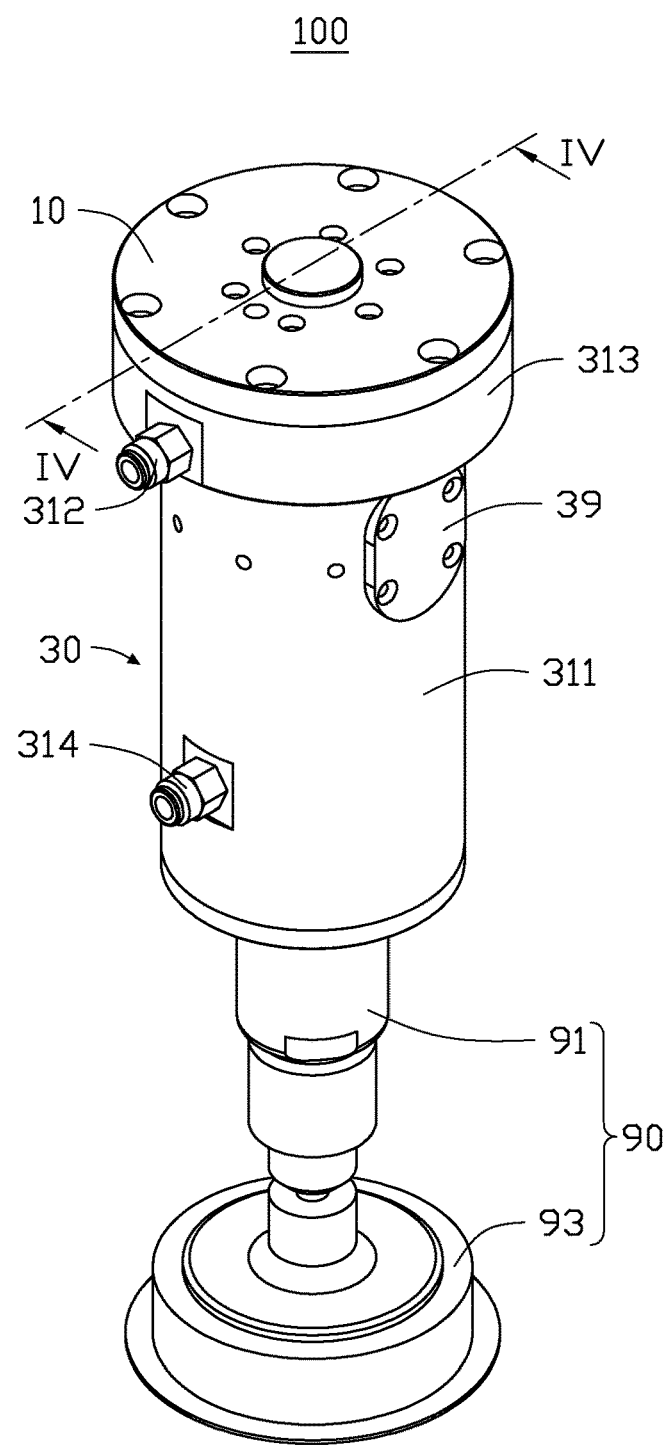
FIG. 1 is an assembled, isometric view of an embodiment of a pneumatic machining device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an embodiment of a pneumatic machining device 100 for machining a surface of a workpiece (not shown). In at least one embodiment, the pneumatic machining device 100 machines the surface of the workpiece by polishing. The pneumatic machining device 100 may include a piston assembly 30 and a machining tool 90. The machining tool 90 may slidable extend out of the piston assembly 30 to move toward the surface of the workpiece.

Figure 2:
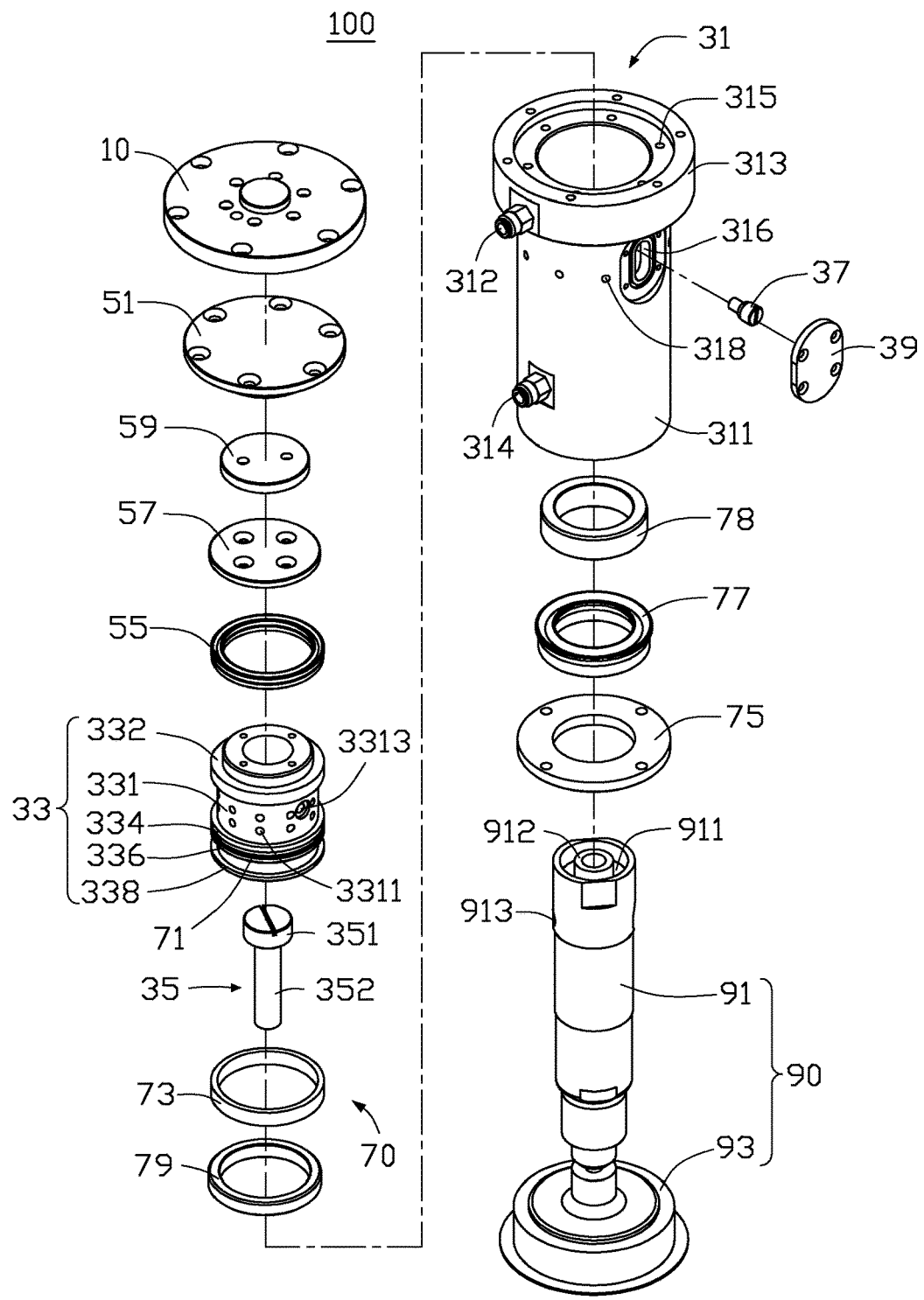
FIG. 2 is an exploded, isometric view of the pneumatic machining device of FIG. 1.
Figure 3:
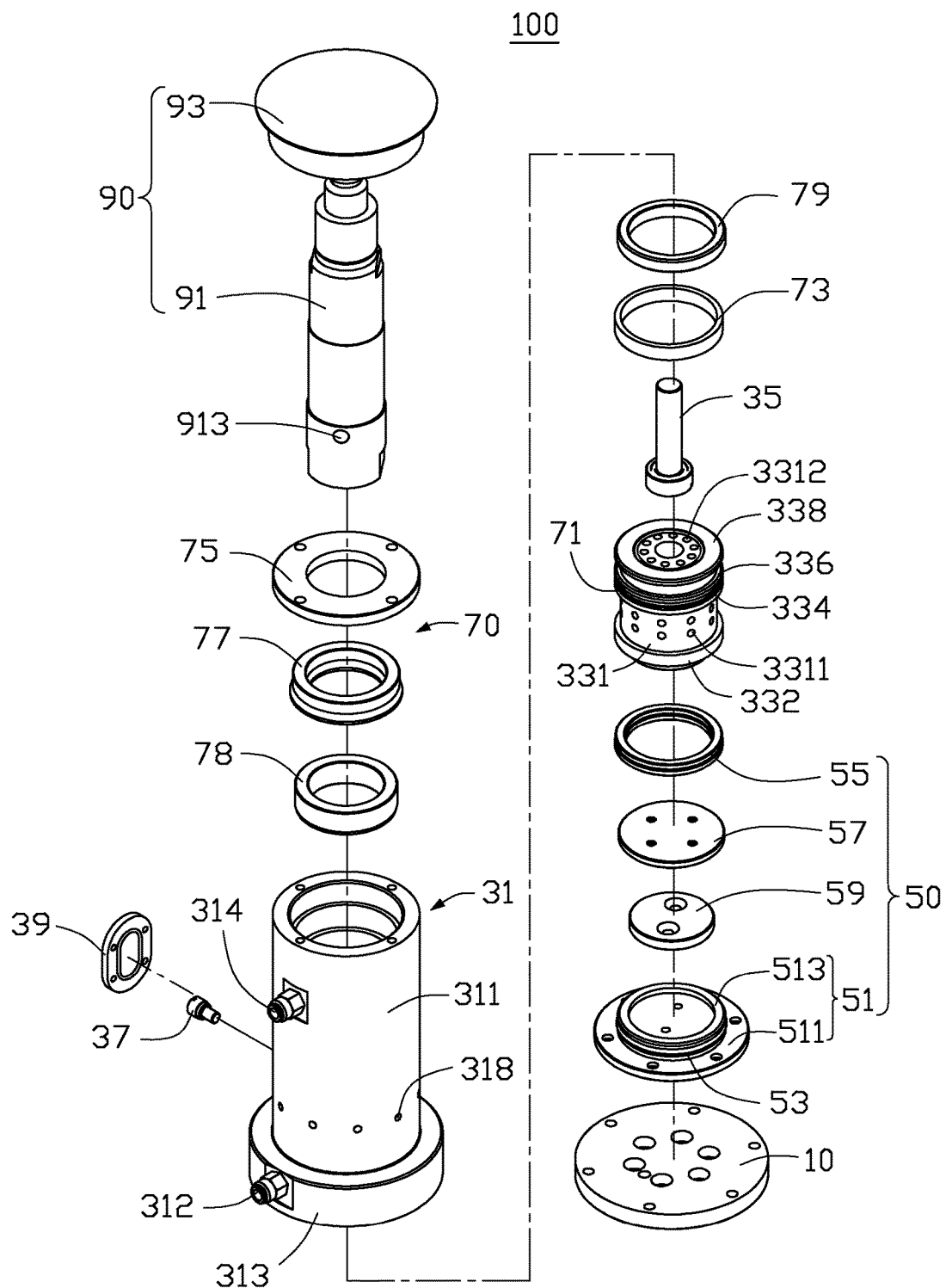
FIG. 3 is similar to FIG. 2, but viewed from a different angle.

Referring to FIGS. 2 and 3, the piston assembly 30 may include a substantially hollow piston shell 31 defining an interior space (not labeled), a piston group 33 received inside the interior space, and a fixing plate 10. The fixing plate 10 may be located on a first end of the piston shell 31 and fix the pneumatic machining device 100 to a robot arm (not shown). The machining tool 90 may extend out of a second end of the piston shell 31. The first end and the second end of the piston shell may both open to the interior space. The piston shell 31 may include a main body 311 and a fixing flange 313. The main body 311 may be substantially cylindrical, and the fixing flange 313 may circumferentially protrude from one end portion of the main body 311. The fixing flange 313 may fix the piston shell 31 to the fixing plate 10. The piston shell 31 may further include a first input valve 312 and a second input valve 314. The first input valve 312 may protrude from a side of the fixing flange 313 and feed gas from a first external pressure source (not shown) into the piston shell 31. The second input valve 314 may protrude from a side of the main body 311 and feed gas from a second external pressure source (not shown) into the piston shell 31. The piston group 33 may be driven under pressure of the first external pressure source to move away from the fixing plate 10. The machining tool 90 may be coupled to the piston group 33 by a coupling member 35. The machining tool 90 may extend out of the piston shell 31 and move toward the surface of the workpiece as the piston group 33 moves away from the fixing plate 10. The machining tool 90 may be driven by the second external pressure source to machine the surface of the workpiece.

The pneumatic machining device 100 may further include a first sealing group 50 and a second sealing group 70 received inside the piston shell 31. The first sealing group 50 and the second sealing group 70 may divide the interior space of the piston shell 31 into a plurality of chambers for controlling a gas pressure for driving the piston group 33 and the machining tool 90. In at least one embodiment, the first sealing group 50 and the piston shell 31 divide the inside of the piston shell 31 into three chambers.

The piston group 33 may include a substantially hollow cylindrical piston body 331 open at opposite ends thereof. A first protruding flange 332, a second protruding flange 334, a third protruding flange 336, and a fourth protruding flange 338 may protrude circumferentially in sequence from a top portion to a bottom portion of the piston body 331. The first protruding flange 332, the second protruding flange 334, the third protruding flange 336, and the fourth protruding flange 338 may be unequally spaced apart from each other. An outer circumferential surface of each of the first through fourth protruding flanges 332-338 may resist against an inner surface of the piston shell 31 to hold the piston group 33 in place inside the piston shell 31.

The piston shell 31 may define an elongated limiting slot 316 in a side of the main body 311. The limiting slot 316 may extend along a lengthwise direction of the main body 311. The piston group 33 may define a limiting hole 3313 in a side portion of the piston body 331. A limiting member 37 may be received in the limiting slot 316 and the limiting hole 3313 to limit movement of the piston group 33 inside the piston shell 31 and to prevent the piston group 33 from rotating in the piston shell 31. A hole cover 39 may be used to cover the limiting slot 316 to prevent air from entering into the piston shell 311 and prevent gas from exiting the piston shell 311 through the limiting slot 316.

The first sealing group 50 may include a first sealing cover 51, a first sealing ring 53 (shown in FIG. 3), a first oil seal 55, a sealing disk 57, and a first cushion pad 59. An end of the fixing flange 313 may form a depressed surface 315 surrounding an opening (not labeled) of the piston shell 31. The first sealing cover 51 may include a first cover portion 511 and a second cover portion 513. The second cover portion 513 may extend from a middle portion of the first cover portion 511. The first cover portion 511 may be supported on the depressed surface 315 of the fixing flange 313, and the second cover portion 513 may protrude into the piston shell 31. The first sealing ring 53 may be sleeved on the second cover portion 513 and resist against an inner circumferential surface of the fixing flange 313. The first oil seal 55 may be sleeved on the top portion of the piston body 331 and supported on the first protruding flange 332. The first oil seal 55 may resist against the inner circumferential surface of the fixing flange 313. The sealing disk 57 is located on the top portion of the piston body 331 and may hold the first oil seal 55 in place on the first protruding flange 332. The first cushion pad 59 is located between the second cover portion 513 and the sealing disk 57. A first chamber 501 (shown in FIG. 4) may be cooperatively defined by the first sealing ring 53, the first oil seal 55, and the inner circumferential surface of the fixing flange 313 of the piston shell 31. A predetermined space (shown in FIG. 4) may be defined between an outer circumferential surface of the first cushion pad 59 and the inner circumferential surface of the fixing flange 313 of the piston shell 31. The predetermined space may make up a majority portion of the first chamber 501.

The first chamber 501 is sealed by the first sealing ring 53 and the first oil seal 55. The pressure of the first chamber 501 is increased by the gas fed therein from the first external pressure source to move the piston group 33 away from the fixing plate 10. The first external pressure source may be turned off when the piston group 33 is moved to an appropriate position for the machining tool 90 to machine the surface of the workpiece. The piston group 33 may be held in place by the gas sealed in the first chamber 501.

The second sealing group 70 may include a second sealing ring 71, a guiding ring 73, a second sealing cover 75, a second oil seal 77, a limiting ring 78, and a second cushion pad 79. The second sealing ring 71 may be sleeved on the piston body 331 and be located between the second protruding flange 334 and the third protruding flange 336. The guiding ring 73 may be sleeved on the piston body 331 and be located between the third protruding flange 336 and the fourth protruding flange 338. The second sealing cover 75 is substantially hollow ring shaped and fixed to an end of the piston shell 31 opposite from the fixing plate 10. The second oil seal 77 is located on the second sealing cover 75 and is received inside the piston shell 31. An outer circumferential surface of the second oil seal 77 may resist against the inner circumferential surface of the piston shell 31. The limiting ring 78 is located on the second oil seal 77 and is received inside the piston shell 31. The piston shell 31 may form a dividing ridge 319 protruding circumferentially from the inner surface of the main body 311, and the second cushion pad 79 may be supported on the dividing ridge 319. In at least one embodiment, the second cushion pad 79 may cushion the piston group 33 against the dividing ridge 319.

Figure 4:
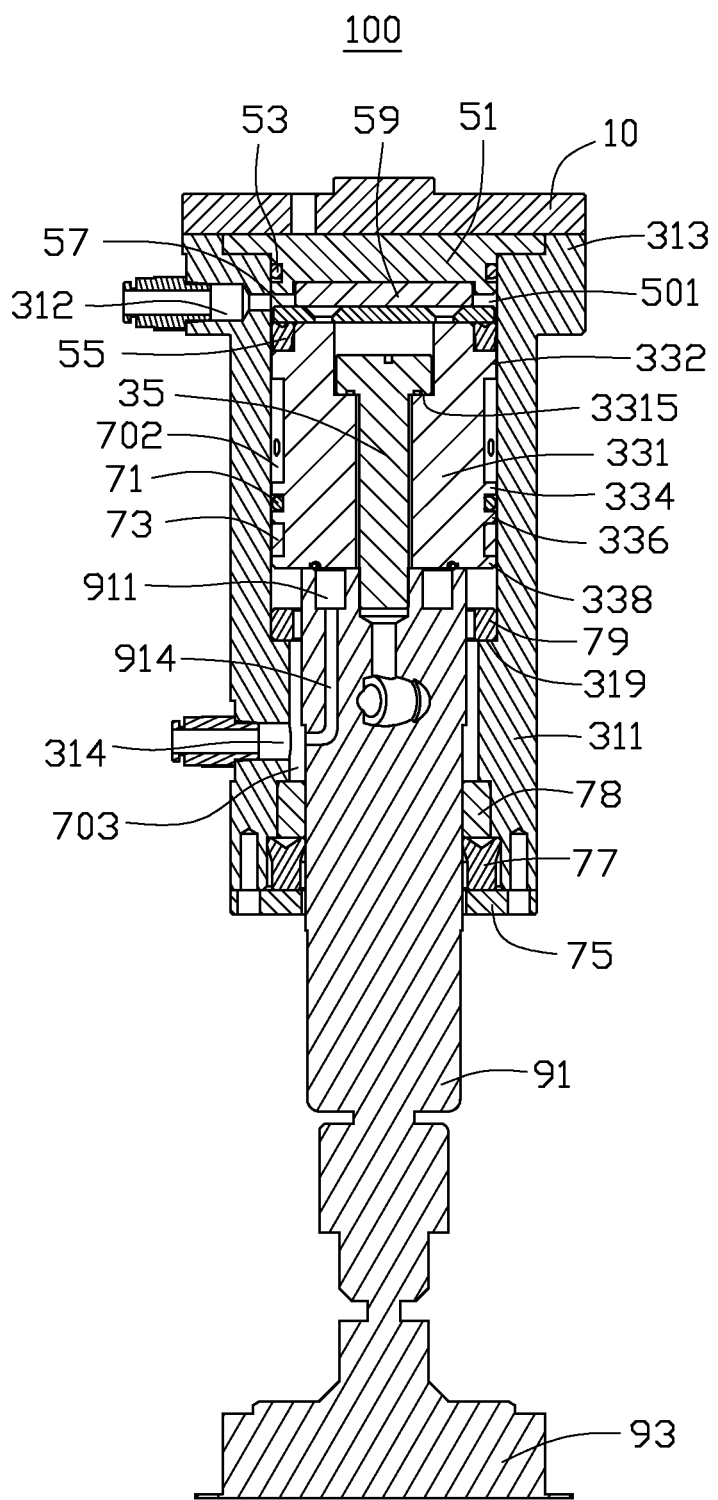
FIG. 4 is a cross-sectional view of the pneumatic machining device taken along line IV-IV of FIG. 1.
Figure 5:
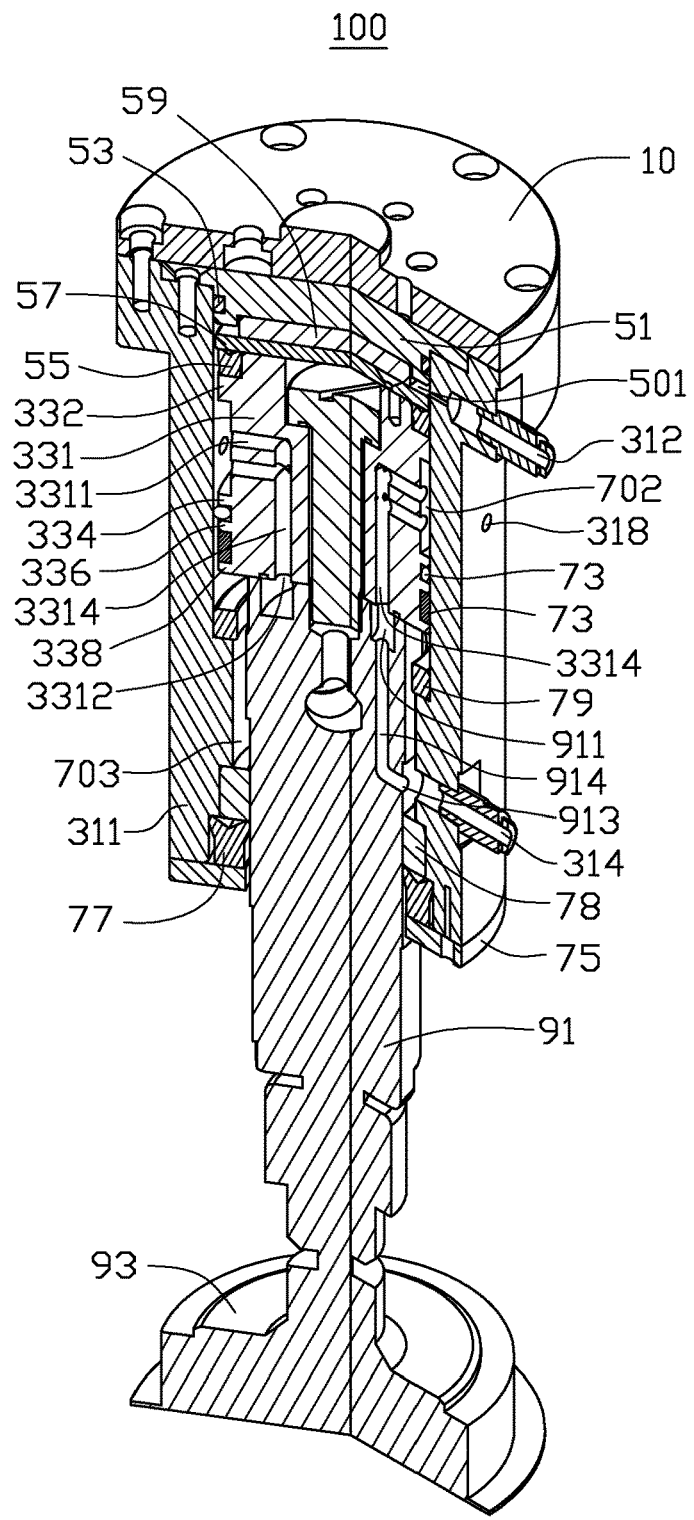
FIG. 5 is a cutaway view of the pneumatic machining device of FIG. 1.

Referring to FIG. 4, the first oil seal 55, the second sealing ring 71, and the inner circumferential surface of the piston shell 31 may cooperatively define a second chamber 702. The second sealing ring 71, the second oil seal 77, and the inner circumferential surface of the piston shell 31 may cooperatively define a third chamber 703.

Referring to FIGS. 2-5, the piston shell 31 may circumferentially define a plurality of first gas holes 318 in the main body 311. The piston group 33 may circumferentially define a plurality of second gas holes 3311 in the piston body 331. The second chamber 702 is in spatial communication with the first gas holes 318 and the second gas holes 3311. Thus, gas may pass from the second gas holes 3311 into the second chamber 702, and then pass out of the first gas holes 318. A plurality of third gas holes 3312 may be defined in a bottom surface of the piston body 331. Each of the plurality of third gas holes 3312 may be connected to at least one of the plurality of second gas holes 3311 by a gas channel 3314 (shown in FIG. 5).

The machining tool 90 may include a driving member 91 and a machining element 93. The driving member 90 may be substantially rod shaped. A first end of the driving member 91 opposite from the machining disk 93 may be received through the second sealing cover 75, the second oil seal 77, and the limiting ring 78 in sequence. The machining element 93 may be coupled to a second end of the driving member 91. The first end of the driving member 91 may define an annular exhaust groove 911. The driving member 91 may form a connecting post 912 located inside the exhaust groove 911. The machining element 93 may be driven by the gas from the second external pressure source to rotate relative to the driving member 91

The coupling member 35 may include a coupling head 351, and a coupling body 352 protruding from one side of the coupling head 351. The piston group 33 may form a connecting ridge 3315 (shown in FIG. 4) circumferentially protruding from an inner circumferential surface of the piston body 331. A diameter of the coupling head 351 is greater than a diameter of the coupling body 352. The coupling member 35 received in the piston body 331 may be held in place by the coupling head 351 resisting against the connecting ridge 3315. The coupling body 352 is inserted into the connecting post 912 of the machining tool 90 to couple the machining tool 90 to the piston group 33.

A gas input hole 913 is defined in a sidewall of the driving member 91 to guide the gas fed into the third chamber 703 into the driving member 91. The gas input hole 913 may be connected to the exhaust groove 911 by an exhaust channel 914. Excess gas fed into the driving member 91 may be released out of the piston shell 31 by passing from the exhaust channel 914 through the exhaust groove 911, the plurality of third gas holes 3312, the plurality of second gas holes 3311, the second chamber 702, and the plurality of first gas holes 318 in sequence.

In use, gas is fed into the first chamber 501 through the first gas input valve 312 to drive the piston group 33 to move away from the fixing plate 10. When the machining tool 90 extends out of the piston shell 311 to a proper position for machining the surface of the workpiece, the first external pressure source is turned off, and the machining tool 90 is held in position by the gas pressure in the first chamber 501. Then, gas is fed into the third chamber 703 through the second gas input valve 314 to drive the machining element 93 to rotate relative to the driving member 91 to machine the surface of the workpiece. Excess gas fed into the driving member 91 is released out of the piston shell 31 to maintain a constant rotation speed of the machining disk 93. Thus, a uniformity of machining the surface of the workpiece is achieved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A pneumatic machining device comprising:
   a piston assembly comprising:
   a piston shell defining an interior space and having a first end open to the defined interior space and a second end open to the interior space;
   a fixing plate attached to the first end of the piston shell;
   a first input valve positioned on the piston shell and communicating with the interior space;
   a second input valve positioned on the piston shell and communicating with the interior space; and
   a piston group received within, and selectively slidable along, the interior space of the piston shell; and
   a machining tool comprising:
   a driving member comprising a first end and a second end, the second end being opposite the first end, the first end of the driving member being coupled to the piston group, and the second end of the driving member extending out from the second end of the piston shell; and
   a machining element attached to the second end of the driving member and being capable of rotating relative to the driving member;
   wherein the piston group comprises a hollow cylindrical piston body open at opposite ends thereof, a first protruding flange, a second protruding flange, a third protruding flange, and a fourth protruding flange each flange circumferentially and sequentially protruding from the piston body from a top portion of the piston body to a bottom portion of the piston body;
   wherein the first protruding flange, the second protruding flange, the third protruding flange, and the fourth protruding flange are spaced unequally from each other; and an outer circumferential surface of the first through fourth protruding flanges resists against an inner surface of the piston shell;
   wherein the first input valve is coupled to a first external pressure source, and activation of the first external pressure source selectively slides the piston assembly along the interior space of the piston shell to move the machining element towards a workpiece; and
   wherein, the second input valve is coupled to a second external pressure source, and activation of the second external pressure source selectively rotates the machining element relative to the driving member.

2. The pneumatic machining device as in claim 1, wherein:
   the pneumatic machining device further comprises a first sealing group and a second sealing group received in the interior space of the piston shell; and
   the first sealing group and the second sealing group divide the interior space of the piston shell into a first chamber, a second chamber, and a third chamber.

3. The pneumatic machining device as in claim 1, wherein the fixing plate is configured to fix the pneumatic machining device to a robotic arm.

4. The pneumatic machining device as in claim 2, wherein:
   the first external pressure source and the second external pressure source are gas sources;
   the first external pressure source feeds gas into the first chamber of the piston shell to cause the machining tool to move away from the fixing plate; and
   the second external pressure source feeds gas into the third chamber of the piston shell to cause the machining element to rotate to machine a surface of the workpiece.

5. The pneumatic machining device as in claim 4, wherein the piston shell further comprises:
   a cylindrical main body; and
   a fixing flange circumferentially protruding from one end portion of the main body, the fixing flange configured to fix the piston shell to the fixing plate;
   wherein a diameter of the fixing flange is greater than a diameter of the main body;
   wherein the first input valve protrudes from a side of the fixing flange; and
   wherein the second input valve protrudes from a side of the main body.

6. The pneumatic machining device as in claim 5, wherein:
   a plurality of first gas holes is defined in the main body of the piston shell; and
   excess gas fed into the second chamber of the piston shell is released through the plurality of first gas holes.

7. The pneumatic machining device as in claim 6, wherein:
   a plurality of second gas holes is defined circumferentially in the piston body between the first and second protruding flanges;
   a plurality of third gas holes is defined in a bottom surface of the piston body;
   each of the plurality of third gas holes is connected to at least one of the plurality of second gas holes by a gas channel; and
   excess gas from the third chamber is released out of the piston shell by flowing through the plurality of third gas holes, the gas channels, the plurality of second gas holes, and the plurality of first gas holes in sequence.

8. The pneumatic machining device as in claim 7, wherein:
   an elongated limiting slot is defined in a side of the main body of the piston shell, the limiting slot extending lengthwise along the main body;
   a limiting hole is defined in a side of the piston body between the first and second protruding flanges;
   the piston group received inside the piston shell has the limiting hole aligned with the limiting slot;
   a limiting member is received in the limiting slot and the limiting hole to limit movement of the piston group inside the piston shell and to prevent the piston group from rotating in the piston shell; and
   a hole cover is covered on the piston shell and over the limiting slot to prevent air from entering into the second chamber and prevent gas from exiting the second chamber.

9. The pneumatic machining device as in claim 7, wherein:
   an end of the fixing flange forms a depressed surface surrounding an opening of the piston shell;

the first sealing group comprises a first sealing cover, a first sealing ring, a first oil seal, a sealing disk, and a first cushion pad;

the first sealing cover comprises a first cover portion and a second cover portion, the second cover portion extending from a middle portion of the first cover portion;

the first cover portion is supported on the depressed surface of the fixing flange, and the second cover portion protrudes into the piston shell;

the first sealing ring is sleeved on the second cover portion and resists against an inner circumferential surface of the fixing flange;

the first oil seal is sleeved on the top portion of the piston body and supported on the first protruding flange, the first oil seal resisting against the inner circumferential surface of the fixing flange;

the sealing disk is located on the top portion of the piston body and is configured to hold the first oil seal in place on the first protruding flange;

the first cushion pad is located between the second cover portion and the sealing disk, and a predetermined space is defined between an outer circumferential surface of the first cushion pad and the inner circumferential surface of the piston shell; and the first chamber is cooperatively defined by the first sealing ring, the first oil seal, and the inner circumferential surface of the piston shell.

10. The pneumatic machining device as in claim 9, wherein the first chamber is sealed by the first sealing ring and the first oil seal; the pressure of the first chamber is increased by the gas fed therein from the first external pressure source to move the piston group away from the fixing plate; the first external pressure source is turned off when the piston group is moved to an appropriate position for the machining tool to machine the surface of the workpiece; and the piston group is held in place by the gas sealed in the first chamber.

11. The pneumatic machining device as in claim 9, wherein:

the second sealing group comprises a second sealing ring, a guiding ring, a second sealing cover, a second oil seal, a limiting ring, and a second cushion pad;

the second sealing ring is sleeved on the piston body and located between the second and third protruding flanges;

the guiding ring is sleeved on the piston body and located between the third and fourth protruding flanges;

the second sealing cover is hollow ring shaped and fixed to an end of the piston shell opposite from the fixing plate;

the second oil seal is located on the second sealing cover and received inside the piston shell, and an outer circumferential surface of the second oil seal resists against the inner circumferential surface of the piston shell;

the limiting ring is located on the second oil seal and received inside the piston shell;

the piston shell forms a dividing ridge protruding circumferentially from the inner surface of the main body, and the second cushion pad is supported on the dividing ridge;

the second cushion pad is configured to cushion the piston group against the dividing ridge;

the second chamber is cooperatively defined by the first oil seal, the second sealing ring, and the inner circumferential surface of the piston shell; and the third chamber is cooperatively defined by the second sealing ring, the second oil seal, and the inner circumferential surface of the piston shell.

12. The pneumatic machining device as in claim 11, wherein:

the second chamber is in spatial communication with the plurality of first gas holes and the plurality of second gas holes;

the gas fed into the third chamber by the second external pressure source passes through the third chamber into the machining tool to drive the machining tool to rotate to machine the surface of the workpiece;

excess gas fed into the third chamber is released outside of the piston shell by passing through the plurality of second gas holes of the piston body into the second chamber, and then passing through the plurality of first gas holes of the piston shell.

13. The pneumatic machining device as in claim 1, wherein:

the pneumatic machining device further comprises a coupling member to couple the machining tool to the piston group;

the coupling member comprises a coupling head and a coupling body protruding from one side of the coupling head;

a diameter of the coupling head is greater than a diameter of the coupling body;

the piston group forms a connecting ridge circumferentially protruding from an inner circumferential surface of the piston body;

the coupling member received in the piston body is held in place by the coupling head resisting against the connecting ridge, and the coupling body is inserted into the machining tool to couple the machining tool to the piston group.

14. The pneumatic machining device as in claim 12, wherein:

the first end of the driving member is received through the second sealing cover, the second oil seal, and the limiting ring in sequence;

the first end of the driving member defines an annular exhaust groove;

the driving member forms a connecting post located inside the exhaust groove;

the coupling body of the coupling member inserts into the connecting post to couple the driving member to the piston group;

the exhaust groove aligns with the plurality of third gas holes;

a gas input hole is defined in a sidewall of the driving member to guide the gas fed into the third chamber into the driving member;

the gas input hole is connected to the exhaust groove by an exhaust channel; and excess gas fed into the driving member is released outside of the piston shell by passing from the exhaust channel through the exhaust groove, the plurality of third gas holes, the plurality of second gas holes, the second chamber, and the plurality of first gas holes in sequence.

15. A pneumatic machining device comprising:
a piston assembly comprising:
a piston shell defining an interior space and having a first end open to the defined interior space and a second end open to the interior space;

a fixing plate attached to the first end of the piston shell;
a first input valve positioned on the piston shell and communicating with the interior space;
a second input valve positioned on the piston shell and communicating with the interior space; and
a piston group received within, and selectively slidable along, the interior space of the piston shell;
a machining tool comprising:
a driving member comprising a first end and a second end, the second end being opposite the first end, the first end of the driving member being coupled to the piston group, and the second end of the driving member extending out from the second end of the piston shell; and
a machining element attached to the second end of the driving member and being capable of rotating relative to the driving member; and
a coupling member comprising a coupling head and a coupling body protruding from one side of the coupling head, a diameter of the coupling head being greater than a diameter of the coupling body;
wherein the piston group forms a connecting ridge circumferentially protruding from an inner circumferential surface of the piston group; the coupling member received in the piston group is held in place by the coupling head resisting against the connecting ridge, and the coupling body is inserted into the machining tool to couple the machining tool to the piston group;
wherein the first input valve is coupled to a first external pressure source, and activation of the first external pressure source selectively slides the piston assembly along the interior space of the piston shell to move the machining element towards a workpiece; and
wherein, the second input valve is coupled to a second external pressure source, and activation of the second external pressure source selectively rotates the machining element relative to the driving member.

16. The pneumatic machining device as in claim 15, wherein:
the pneumatic machining device further comprises a first sealing group and a second sealing group received in the interior space of the piston shell; and
the first sealing group and the second sealing group divide the interior space of the piston shell into a first chamber, a second chamber, and a third chamber.

17. The pneumatic machining device as in claim 16, wherein:
the first external pressure source and the second external pressure source are gas sources;
the first external pressure source feeds gas into the first chamber of the piston shell to cause the machining tool to move away from the fixing plate; and
the second external pressure source feeds gas into the third chamber of the piston shell to cause the machining element to rotate to machine a surface of the workpiece.

18. The pneumatic machining device as in claim 17, wherein the piston shell further comprises:
a cylindrical main body; and
a fixing flange circumferentially protruding from one end portion of the main body, the fixing flange configured to fix the piston shell to the fixing plate;
wherein a diameter of the fixing flange is greater than a diameter of the main body;
wherein the first input valve protrudes from a side of the fixing flange; and
wherein the second input valve protrudes from a side of the main body.

* * * * *

UNITED STATES PATENT AND TRADEMARK OFFICE
CERTIFICATE OF CORRECTION

PATENT NO. : 10,029,347 B2
APPLICATION NO. : 14/832411
DATED : July 24, 2018
INVENTOR(S) : Ren-Gui Xie, Ai-Jun Tang and Feng Zhang Page 1 of 1

It is certified that error appears in the above-identified patent and that said Letters Patent is hereby corrected as shown below:

On the Title Page

Item (73) regarding "Assignees" should read:
(73) Assignees: SHENZHENSHI YUZHAN PRECISION TECHNOLOGY CO., LTD., Shenzhen (CN); CLOUD NETWORK TECHNOLOGY SINGAPORE PTE. LTD., Singapore (SG)

Signed and Sealed this
Fifteenth Day of September, 2020

Andrei Iancu
*Director of the United States Patent and Trademark Office*